United States Patent [19]

Mitsuhashi

[11] Patent Number: 5,727,133
[45] Date of Patent: Mar. 10, 1998

[54] OUTPUT APPARATUS WITH SELECTION OF EXTERNALLY STORED CONTROL PROGRAMS FROM INPUT DATA

[75] Inventor: Shunya Mitsuhashi, Tokyo, Japan

[73] Assignee: Canon Kabushiki Kaisha, Tokyo, Japan

[21] Appl. No.: 984,686

[22] Filed: Dec. 2, 1992

[30] Foreign Application Priority Data

Dec. 2, 1991 [JP] Japan ................................ 3-317744

[51] Int. Cl.$^6$ .................................................. G06K 15/00
[52] U.S. Cl. .................................................. 395/101; 395/114
[58] Field of Search .................................. 395/101, 117, 395/116, 112, 114, 115, 110; 400/54, 76

[56] References Cited

U.S. PATENT DOCUMENTS

| | | | |
|---|---|---|---|
| 4,968,159 | 11/1990 | Sasaki et al. | 400/76 |
| 5,133,610 | 7/1992 | Sukigara | 400/54 |
| 5,142,613 | 8/1992 | Morikawa et al. | 395/110 |
| 5,146,544 | 9/1992 | Altham et al. | 395/115 |
| 5,165,014 | 11/1992 | Vassar | 395/112 |
| 5,228,118 | 7/1993 | Sasaki | 395/112 |
| 5,268,993 | 12/1993 | Ikenoue et al. | 395/114 |
| 5,293,466 | 3/1994 | Bringmann | 395/114 |

FOREIGN PATENT DOCUMENTS

| | | |
|---|---|---|
| A0332779 | 9/1989 | European Pat. Off. . |
| WO A9204672 | 3/1992 | European Pat. Off. . |
| 1314177 | 12/1989 | Japan . |

*Primary Examiner*—Raymond J. Bayerl
*Assistant Examiner*—Steven P. Sax
*Attorney, Agent, or Firm*—Fitzpatrick, Cella, Harper & Scinto

[57] ABSTRACT

An output apparatus such as a laser beam printer comprises: a storage medium to store a control code which is peculiar to a control program; a judging circuit to judge whether the peculiar code is included in input data or not; and a deciding circuit to decide that the control program having the peculiar code is made correspond to the input data. The control program comprises control codes. The input data includes the peculiar control code and character code. When an amount of input data is less than an amount of data which is needed to perform the judgment, the deciding means decides that a predetermined control program is made correspond to the input data.

9 Claims, 10 Drawing Sheets

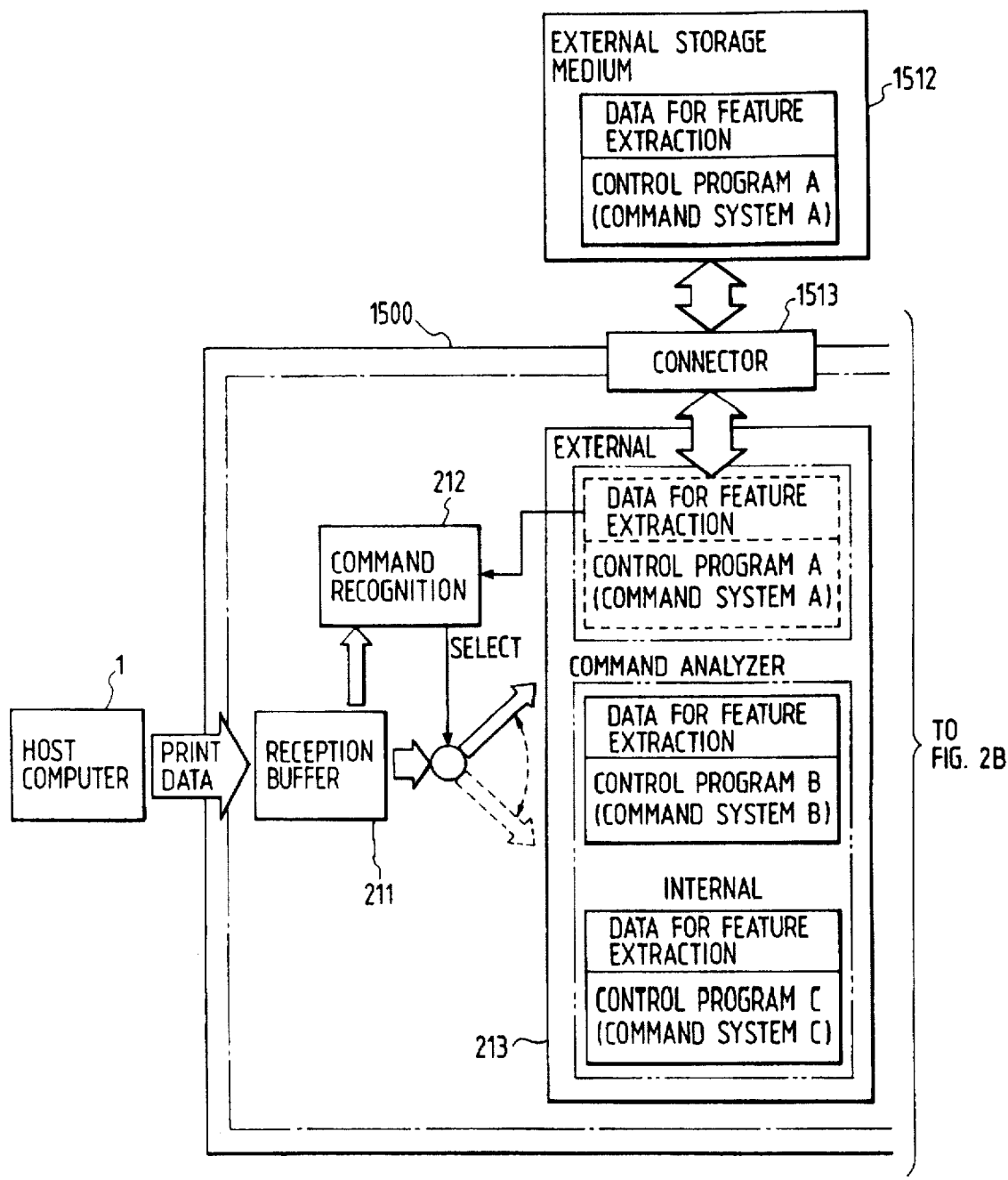

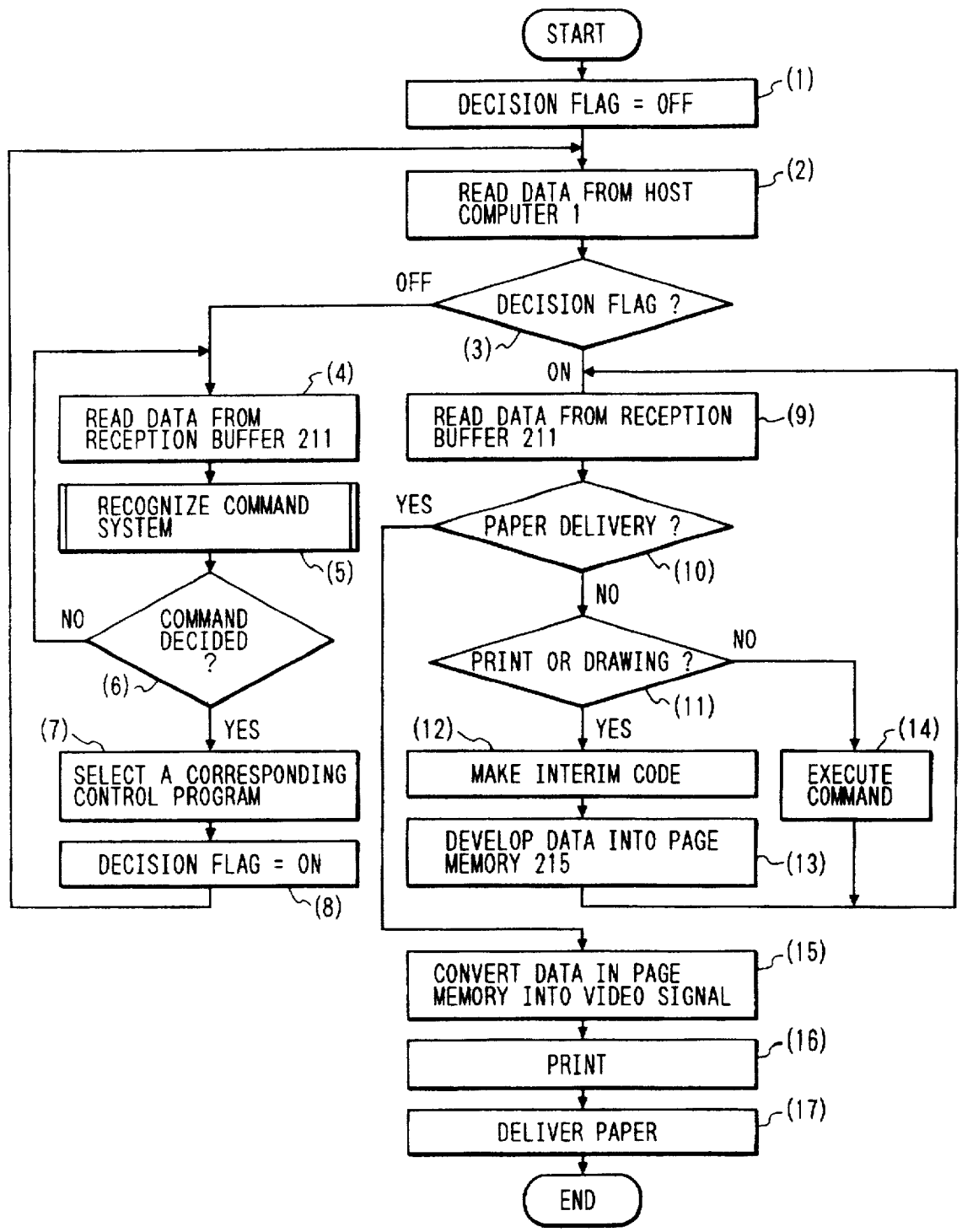

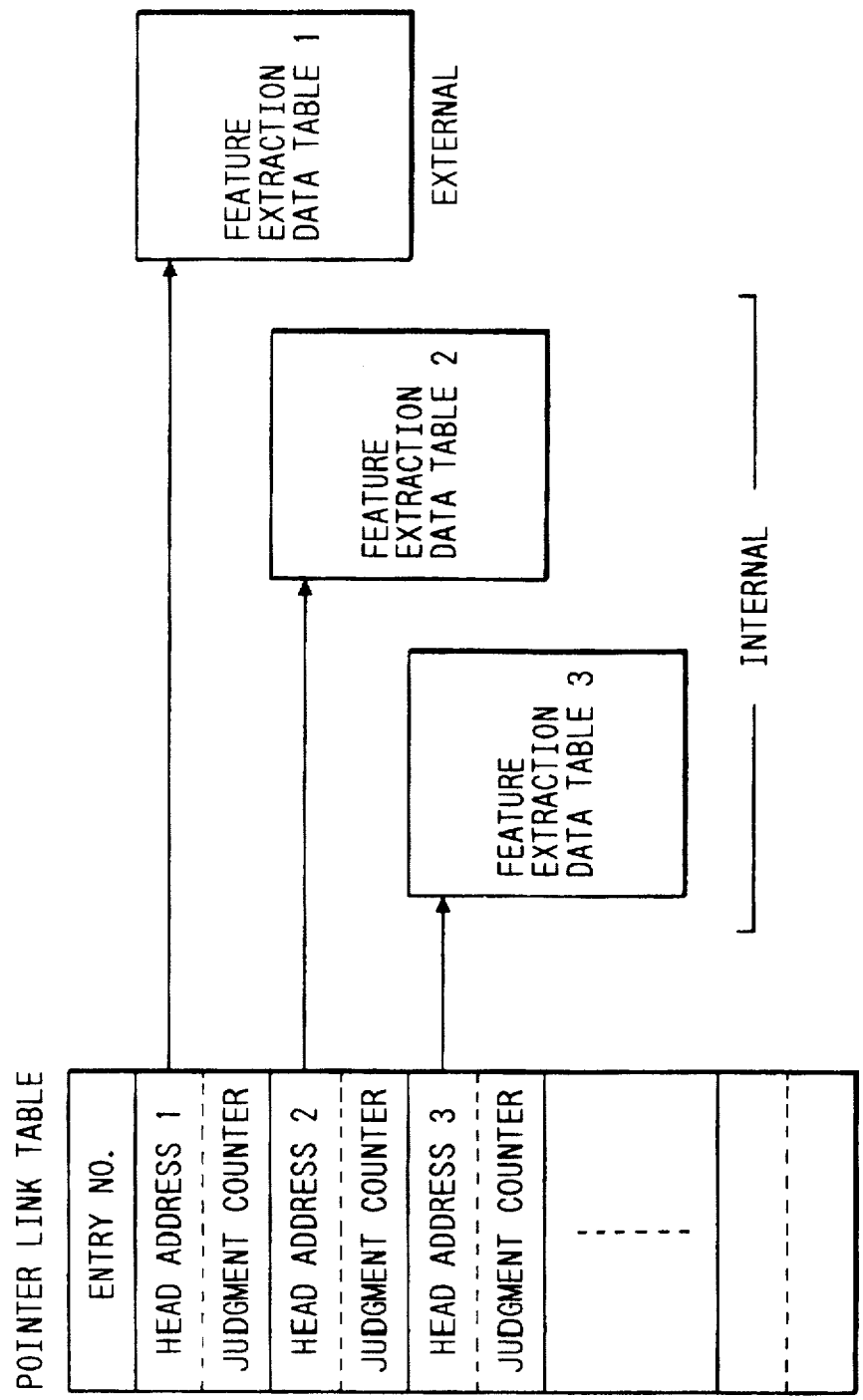

OUTPUT APPARATUS WITH SELECTION OF EXTERNALLY STORED CONTROL PROGRAMS FROM INPUT DATA

BACKGROUND OF THE INVENTION

1. Field of the Invention

The invention relates to an output apparatus for automatically selecting a control program corresponding to input data and forming and generating output information on the basis of the control program and the input data.

2. Related Background Art

Hitherto, there has been considered an output apparatus in which various print data specified by the ASCII code or Japanese Industrial Standard (JIS) code is automatically discriminated and a print control program prepared for every kind (command system) of the print data code is executed, thereby printing print data of different command systems.

There is also considered a method whereby the newly formed print control program is stored in an external storage medium and the external storage medium is switched and connected to an output device, thereby handling the print data of many kinds of command systems.

The print control program is selected by discriminating the kind of print data. Such a kind selection is performed by referring to the print data and a feature parameter which has been defined for every print control program.

In the conventional output apparatus, however, since the feature parameter has previously been stored in a memory of the output apparatus main body, in the case where a new print control program is stored in an external storage medium and used, a feature parameter corresponding to the new print control program must be added to the content in the memory on the apparatus main body side.

SUMMARY OF THE INVENTION

The invention is made in consideration of the above conventional example and it is an object of the invention to provide an output apparatus in which since a control program and a feature parameter to discriminate the control program are previously stored in an external storage medium such as an ROM card or the like, a command system can be automatically recognized without changing the stored content regarding a feature parameter on the apparatus main body side.

To accomplish the above object, an output apparatus of the invention comprises: storage means for storing a control code which is peculiar to a control program; judging means for judging whether the peculiar code is included in input data or not; and deciding means for deciding that the control program having the peculiar code is made correspond to the input data on the basis of the result of the judgment.

The output apparatus also comprises: connecting means for connecting an external storage medium in which a control program has been stored; judging means for judging whether a control code which is peculiar to the control program is included in input data or not; and deciding means for deciding that the control program is made correspond to the input data on the basis of the result of the judgment.

The output apparatus also comprises: storage means for storing a common control code corresponding to a plurality of control programs in correspondence to each control program; counter means for counting how many common codes are included in input data with respect to each of the control programs; and deciding means for deciding that which one of the control programs is made correspond to the input data on the basis of the result of the counting.

The output apparatus also comprises: connecting means for connecting an external storage medium in which a plurality of control programs have been stored; counting means for counting how many common control codes corresponding to the control programs are included in input data with respect to each of the control programs; and deciding means for deciding which one of the control programs is made correspond to the input data on the basis of the result of the counting.

BRIEF DESCRIPTION OF THE DRAWINGS

FIG. 2, 2A and 2B represent is a block diagram showing a fundamental construction of the first output apparatus shown in FIG. 1;

FIG. 3 is a flowchart showing a print control procedure of the embodiment;

FIG. 4 is an explanatory diagram showing an example of a pointer link table in the embodiment;

DETAILED DESCRIPTION OF THE PREFERRED EMBODIMENTS

Prior to explaining a construction of the invention, a construction of a laser beam printer which is suitable to apply an embodiment will be first described with reference to FIGS. 1 and 2.

The printer to which the embodiment is applied is not limited to the laser beam printer but can be also applied to a printer of another printing type such as an ink jet printer, which will be explained hereinlater.

Figure 1:
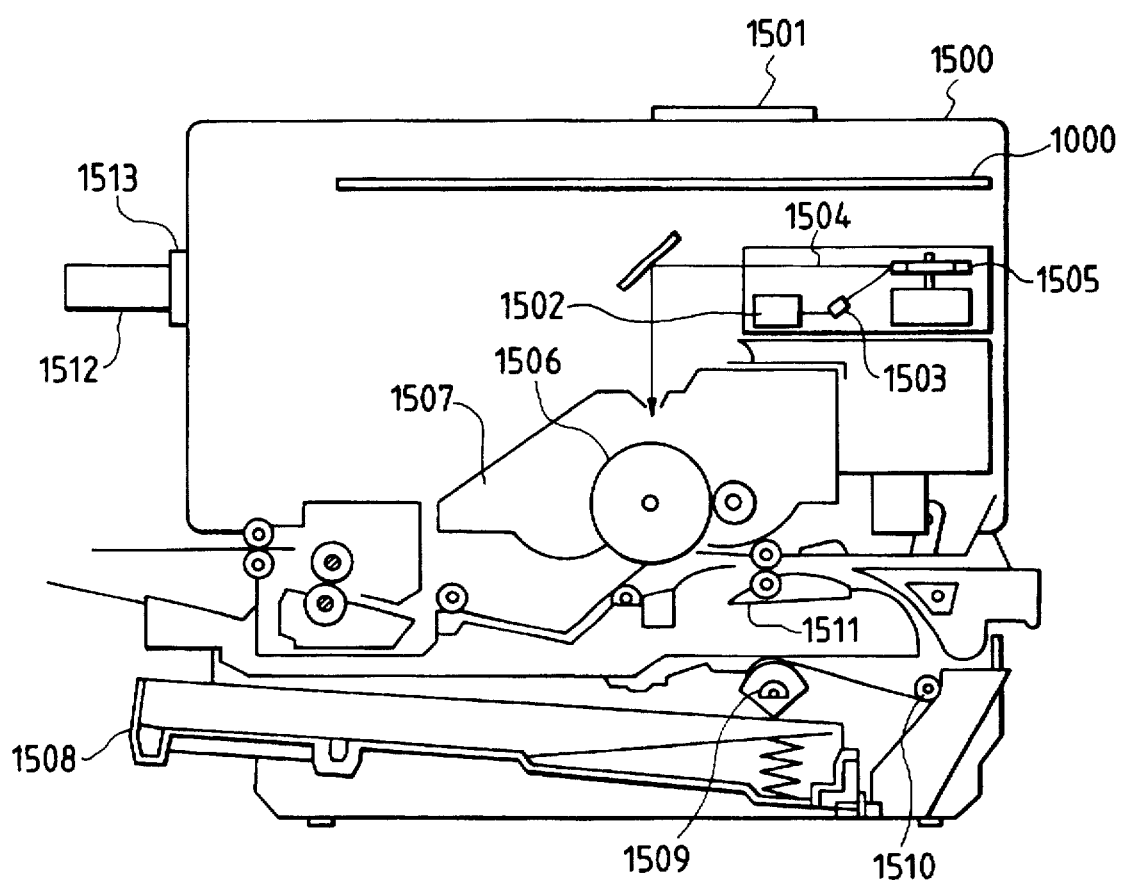
FIG. 1 is a cross sectional view showing a construction of a first output apparatus to which the invention can be applied.

FIG. 1 is a cross sectional view showing a construction of a first output apparatus to which the invention can be applied. For example, FIG. 1 shows the case of a laser beam printer (LBP).

In the diagrams, reference numeral 1500 denotes an LBP main body. The LBP 1500 receives and stores print data (character codes and the like), form data, macro instruction, or the like which are supplied from an external apparatus such as a host computer or the like which is connected to the outside. The LBP forms a corresponding character pattern, a form pattern, or the like in accordance with those input data and forms an image on a recording paper as a recording medium. Reference numeral 1501 denotes an operational panel on which switches for operation, an LED display, and the like are arranged. Reference numeral 1000 denotes a printer control unit for controlling the whole LBP, main body 1500 and analyzing the print data or the like which is supplied from the host computer. The printer control unit 1000 mainly converts a character code into a video signal of a corresponding character pattern and supplies it to a laser driver 1502. The laser driver 1502 is a circuit to drive a semiconductor laser 1503 and on/off switches a laser beam 1504 which is emitted from the semiconductor laser 1503 in accordance with the input video signal. The laser beam 1504 is allowed to swing to the right and left by a rotary polygon mirror 1505 and scans and exposes on an electrostatic drum 1506. Thus, an electrostatic latent image of a character pattern is formed on the electrostatic drum 1506. The latent image is developed by a developing unit 1507 arranged around the drum 1506 and, after that, it is transferred onto a recording paper. A cut sheet is used as a recording paper. The cut sheet recording papers are enclosed in a sheet cassette 1508 set in the LBP 1500 and are taken into the apparatus one by one by a feed roller 1509 and conveying rollers 1510 and 1511 and supplied to the electrostatic drum 1506.

Reference numeral 1512 denotes an external storage medium in which the control program and the like have been stored. The storage medium 1512 is set into the LBP main body 1500 through a connector 1513.

Figure 2B:
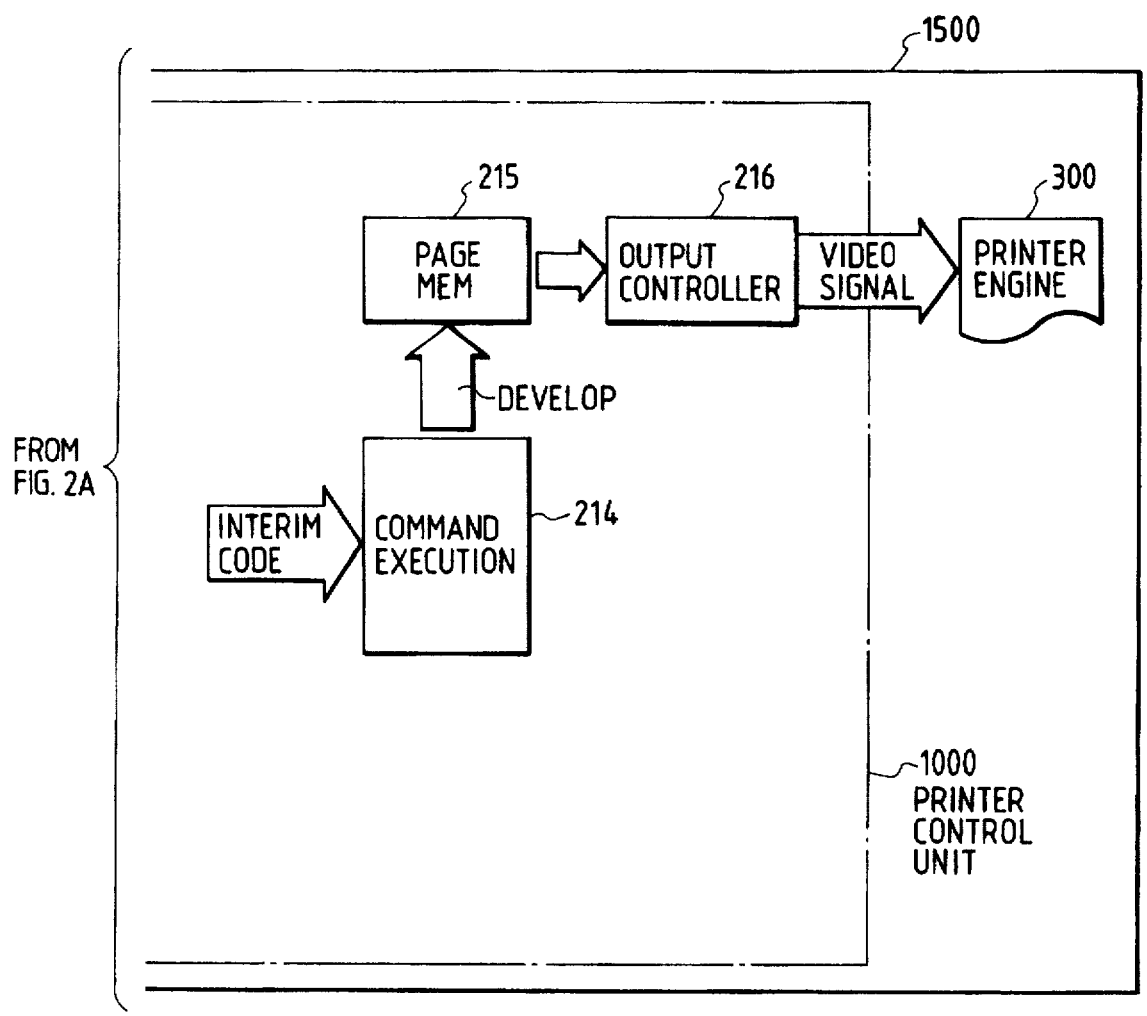

FIG. 2 is a block diagram showing a schematic construction of an output apparatus according to an embodiment of the invention. In FIG. 2, the same component elements as those shown in FIG. 1 are designated by the same reference numerals.

In the diagram, reference numeral 1 denotes a host computer which generates print data comprising a character code, a control code, and the like to the LBP main body 1500.

The LBP main body 1500 is mainly constructed by: the printer control unit 1000 comprising a reception buffer 211, a command recognition processing section 212 to automatically recognize a print control command system, a command analyzer 213, a command execution section 214, a page memory 215, an output controller 216, and the like; a printer engine 300; the connector 1513 which is used to set the external storage medium 1512 into the LBP main body 1500; and the like.

Practically speaking, the printer control unit 1000 is constructed of a computer system using a central processing unit (cPu), a read only memory (ROM), a random access memory (RAM), and the like.

The reception buffer 211 is constructed of an RAM to temporarily store the print data received from the host computer 1 or the like.

In the automatic recognition processing section 212, on the basis of flowcharts shown in FIGS. 3 and 7, which will be explained hereinlater, the CPU checks a part of the content in the reception buffer 211 and discriminates by which kind of command system the print data sent from the host computer 1 has been described. A selecting process to select the corresponding control program is executed in the command analyzer 213, which will be explained hereinlater.

A plurality of pairs of the control programs according to each print control command system and feature extraction data for an automatic recognizing process have been stored in the command analyzer 213. Areas to store those data are divided into an internal area and an external area comprising ROMs or RAMs. When the external area is selected by the processing section 212, the area provided in the external storage medium 1512 comprising the ROM is selected through the connector 1513.

A command analyzed by the command analyzer 213 corresponds to an intermediate result of the analysis of the print data-and is converted into a form of an interim code of a format which can be more easily processed in the command execution section 214. In the command execution section 214, on the basis of the flowchart shown in FIG. 3, which will be explained hereinlater, the CPU executes each command by the interim code and successively develops the command regarding the drawing into the page memory 215 comprising a RAM.

The output controller 216 converts the content in the page memory 215 into the video signal and transfers the image to the printer engine 300. The printer engine 300 is a printer mechanism section to form a permanent visible image onto a recording paper on the basis of the received video signal.

In the output apparatus with the above construction, a whole print control processing procedure by the CPU according to the embodiment will now be described with reference to the flowchart shown in FIG. 3. In FIG. 3, reference numerals (1) to (17) denote processing steps.

In step (1), a decision flag in the RAM is first initialized. The decision flag is a flag to discriminate whether a command system has been decided in a print control command system automatic recognizing process, which will be explained hereinlater, or not.

The print data is subsequently received from the host computer 1. The received data is sequentially stored into the reception buffer 211 (2). When the minimum limit data which is needed to execute the print control command system automatic recognizing process is stored, into the reception buffer 211, the CPU checks a state of the decision flag in step (3). When the command system is decided, step (9) follows. If NO, step (4) follows.

When the number of data stored in the reception buffer 211 is less than the minimum limit number of data which is needed to execute the print control command system automatic recognizing process, the apparatus waits for a predetermined time. When no data is sent even after the elapse of such a predetermined time, it is regarded that the time-out has come and the decision flag is turned on by a default command system. The processing routine advances to step (3).

Steps (4) to (8) denote processes regarding the print control command system automatic recognition processing section 212.

First, a predetermined character train is read out from the reception buffer 211 in step (4). The character train is given as a parameter to the print control command system automatic recognizing process in step (5). The content of the process in step (5) will be explained hereinlater. On the basis of the result of the recognizing process in step (5), a check is made in step (6) to see to which one the command system sent from the host computer 1 has been decided. When the command system is decided, the control program corresponding, to the decided command system is selected in step (7). The decision flag is turned on (8). The processes are again repeated again from step (2).

When the command is not decided in step (6), the processing routine is returned to step (4). The CPU further reads out a predetermined character train from the reception buffer 211 and continues the automatic-recognizing process. However, there is a preset limit value when such a processing loop is repeated. When the number of repetition times exceeds such a preset limit value, the decision flag is turned on by the default command system (control program).

When the decision flag is on in step (3), since the control program to be used has also been decided, the CPU reads out the content of the reception buffer 211 from the beginning (9) and sends to the command analyzer 213.

In the command analyzer 213, the CPU first checks to see if the received command is a paper delivery command or not (10). In case of the paper delivery command, step (15) follows and an outputting process is executed.

When the analyzed data does not indicate the paper delivery command in step (10), a check is made to see if the analyzed command indicates a command for a developing process into the page memory 215 such as character printing, figure drawing, or the like or not (11). If NO, step (14) follows and the command is immediately executed.

When the processing routine advances from step (11) to step (12), an interim code of a form in which the development command executing process can be easily performed is formed. In response to the interim code, the development command execution processing section 214 executes the developing process into the page memory 215 (13). After completion of the developing process, the processing routine is returned to step (9) and the analyzing process of the data is repeated.

When it is determined in step (10) that the analyzed data indicates the paper delivery command, the output controller 216 converts the content in the page memory 215 into the video signal for the printer engine 300 and transfers and generates the image (15).

The printer engine 300 forms and prints a permanent visible image onto the recording paper on the basis of the received video signal (16). When the printed result is delivered, the print control process per one page is finished (17).

Although the operation of the whole printing apparatus has been described on the basis of the flowchart shown in FIG. 3, those processes are realized by a computer system of the printer control unit 1000. The print control command system automatic recognizing process in step (5) in FIG. 3 will now be further described in detail.

<Process at the start of the automatic recognizing process>

An entry method of a feature extraction data table which is referred in the automatic recognizing process will be first described with reference to FIG. 4.

(a) The CPU searches each data type portion, which will be explained hereinlater, of a group of data provided in the printing apparatus and finds out a data portion having a data type indicative of the feature extraction data table.

(b) In the case where the external storage medium 1512 is set into the LBP main body 1500, the CPU also searches a group of data in the external storage medium.

(c) When the feature extraction data table is found out, the CPU stores the head address into a head address storage area in a pointer link table and increases the value in an entry number area existing in the head of the pointer link table by +1.

(d) When all of the searching operations by the CPU are finished by repeating the above procedure, all of the feature extraction data tables which are referred in the automatic recognizing process are inputted into the pointer link table. An area which has previously been reserved in a random access memory (RAM) in the computer system is used as a pointer link table. A nonvolatile medium such as read only memory (ROM: also including a card-shaped ROM), magnetic disk, or the like can be used as a feature extraction data table. A RAM area which has been loaded down from the host computer can be also used.

A structure of the feature extraction data table will now be described.

Figure 5:
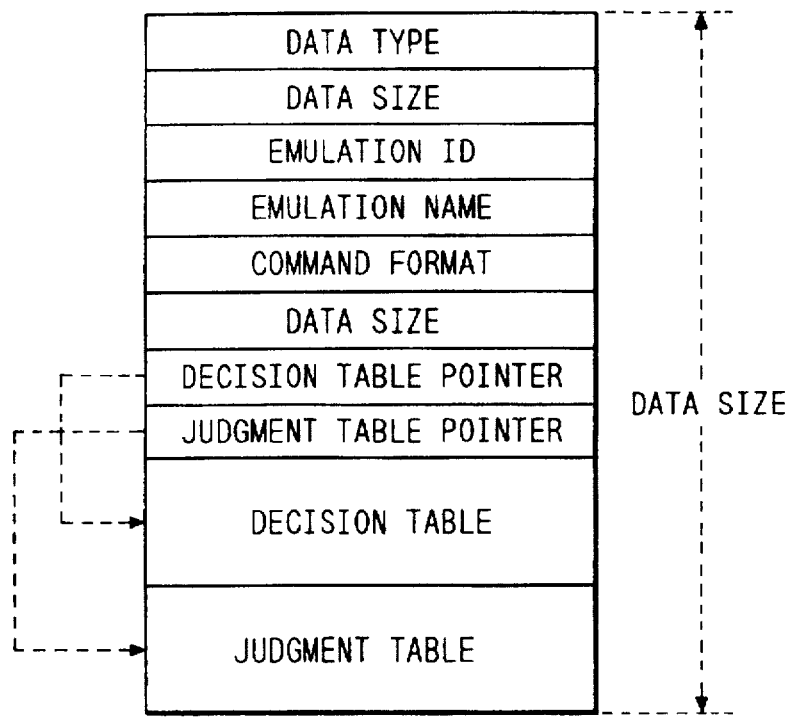
FIG. 5 is an explanatory diagram showing an example of a structure of a feature extraction data table in the embodiment.

FIG. 5 shows a structure of the feature extraction data table in the invention.

The feature extraction table has the following information portions. That is, the feature extraction table comprises: a data type portion indicating that the table relates to the feature extraction data; a data size portion indicative of a size (total number of bytes) of whole table; an emulation ID portion which describes a predetermined ID number which is peculiar to each command system; an emulation name portion which describes the name of each command system; a command format portion to store a command format; a decision table pointer portion to indicate the head address in a decision table, which will be explained hereinlater; a judgment table pointer portion to designate a head address in a judgment table; and a decision table portion and a judgment table portion as a substance of the table which are respectively designated by those two pointers.

The commands which are classified in the command format portion are mainly classified into a "control code type" in which 00 h to 1 Fh of the ASCII code are used as control codes and a "character train type" in which character codes of 20 h or more of the ASCII code are used. However, there is also a mixed type of the control code type and character train type in accordance with the emulation.

In the control code type, a consecutive type in which a terminator (command identifier) is continuous to the control code and an end type in which the control code and the terminator (command identifier) are away from each other and a parameter exists between them exist. They can be classified in brief as follows.

(1) Control code type (consecutive type) (e.g.) [ESC] E . . . reset command in a printer language A (2) Control code type (end type) (e.g.) [CSI] [parameter] C . . . reset command in a printer language B (3) Control code type (consecutive, end mixed type)

(4) Character train type (e.g.) AR [parameter] . . . arc drawing command in a printer language C (5) Control code/character train mixed type As data described in the decision table designated by the decision table pointer, only feature commands which do not exist in the other command systems are listed up. If at least one coincident data exists among the received data, the command system can be decided.

In the judgment table, command data (for example, command data which is common to each command system) other than the decision table is described. The judgment table is used as a discrimination reference in the automatic recognition. The commands in the table and the received data are compared. When there is the coincident data, the value of the judgment counter corresponding to the pointer link table is increased by +1. As the value of the judgment counter is large, a probability is high.

Figure 6:
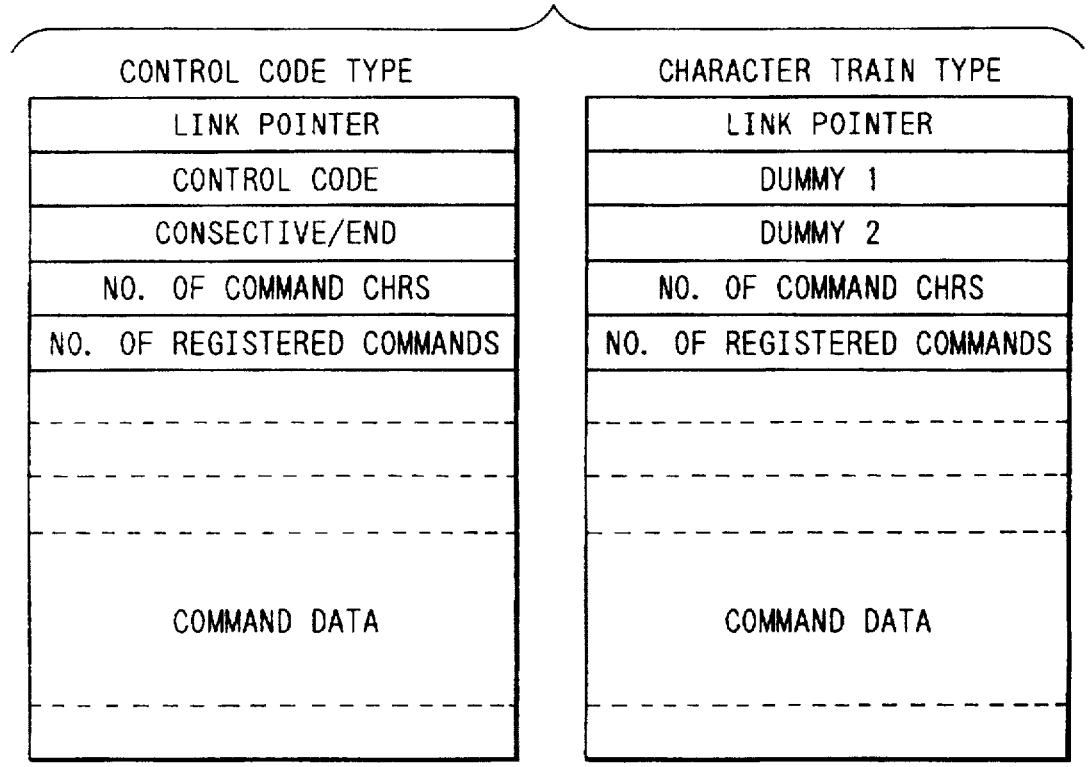
FIG. 6 is an explanatory diagram showing an example of a structure of a decision table and a judgment table in the embodiment.

The decision table and the judgment table have structures shown in FIG. 6.

Although both of them have substantially the same structure, the structures of the command formats in the control code type is slightly different from that of the character train type. In the structure of the table of the control code type, the head addresses of the command tables of different conditions are stored and linked in the link pointer portion. For instance, the commands of different control codes, the commands of different numbers of command characters although they have the same control code, or the like form another small table and are linked. As for the command which is lastly linked, an NULL code (zero) is set into such an area and indicates the end of table.

The control code itself which is used as a command is stored in the control code portion. For example, in the command system of an escape sequence, an escape code (1 Bh) is stored in this area. The area of the next consecutive type/end type portion is provided to distinguish whether the control code type is of the consecutive type or the end type. The number of characters of the command (terminator, command identifier) is stored into the subsequent command character number area. The number of commands registered in the table is stored into the command number area. The subsequent areas relate to the command data portion to describe the command character train by only the number of registered commands.

On the other hand, in the character train type table, in order to match the structure with the control code type table, two unnecessary areas subsequent to the pointer portion are set to space areas as dummy 1 and dummy 2. The subsequent command character number portion, command number portion, and command data describing portion are substantially the same as those in the foregoing control code type table.

A method for the automatic recognizing process will now be described.

<Description of the operation of the print control command system automatic recognition processing section>

Figure 7:
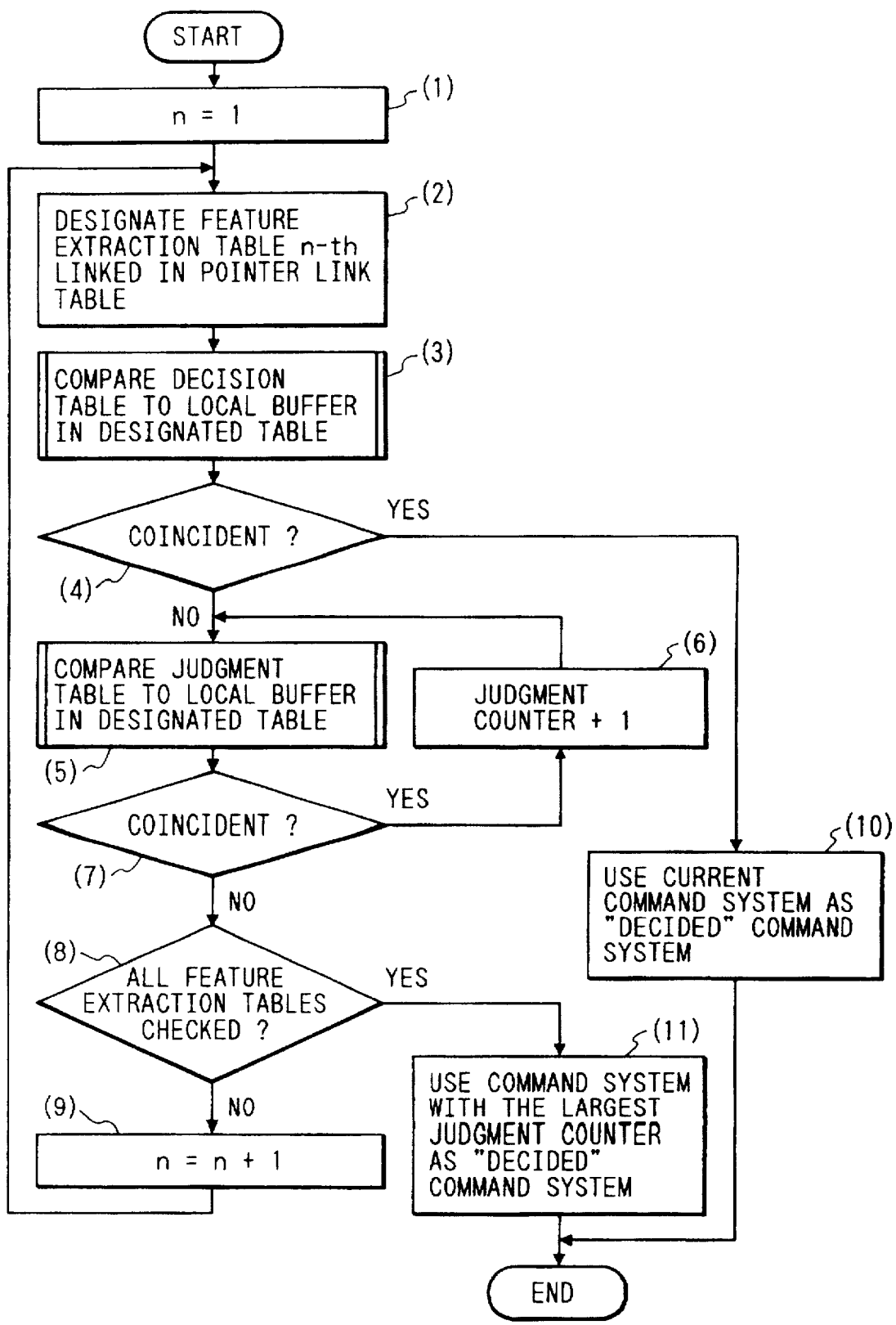
FIG. 7 is a flowchart showing an automatic recognition processing procedure of a control command system in the embodiment.

The function of the print control command system automatic recognition processing section 212 is actually realized by executing a program based on a flowchart shown in FIG. 7 by the CPU.

First, data of, e.g., 128 bytes is read out in a lump from the reception buffer 211 and copied into a local buffer in the RAM. When the reception buffer of a ring bubber structure is used as it is, there is a case where data exists in both of the last and head portions of the reception buffer in the physical space. In such a case, since it is difficult to compare the character train, a local buffer is provided in the automatic recognizing process. When the data of 128 bytes is not received into the reception buffer even after the elapse of a certain time, it is determined that the time-out has occurred. The analysis is executed by the default command system (for instance, command system B shown in FIG. 2).

A subsequent print control command system automatic recognition processing procedure will now be described with reference to the flowchart shown in FIG. 7. In FIG. 7, reference numerals (1) to (11) denote processing steps.

In step (1), a counter n to manage the number of entries in the feature extraction data table is initialized to 1. Subsequently, the n-th linked feature extraction data table in the pointer link table is designated (2).

The decision table in the feature extraction data table is compared with the content in the local buffer (3). When the feature parameter stored in the feature extraction data table in the external storage medium 1512 is compared with the content in the local buffer, the CPU reads the feature parameter of the feature extraction data table stored in the external storage medium 1512.

In step (4), when there is the coincident data as a result of the comparison of the contents, the processing routine advances to step (10) and the current command system which has been checked at that time point is decided as a command system. If they do not coincide, step (5) follows.

In step (5), the judgment table in the feature extraction data table is compared with the content in the local buffer. In step (7), a check is made to see if there is a coincident data: If YES, step (6) follows and the value of the n-th judgment counter in the pointer link table is increased by +1.

When there is no coincident data in step (7), step (8) follows and a check is made to see if all of the feature extraction data tables stored in the pointer link table have been checked or not.

If there is any other feature extraction data table which is not yet checked, the counter n is increased by +1 in step (9). The processes in step (2) and subsequent steps are again repeated. If all of the feature extraction data tables stored have completely been checked in step (8), the command system of the largest counter value is decided as a command system by checking all of the judgment counters in the pointer link table (11). When the values of the judgment counters are equal and the command system cannot be decided, the default command system (for example, command system B shown in FIG. 2) can be also decided.

By the above processes, the content of the kind of the command of the print data, namely, the command system is decided in the print control command system automatic recognition.

In the above embodiment, the decision table in the feature extraction data table is compared with the content in the local buffer in step (3) in the flowchart shown in in FIG. 7 and, when there is no coincident data in step (4), the judgment table of the feature extraction data table is compared with the content in the local buffer in step (4), so that the comparison of the content with the n-th feature extraction data table can be strictly performed. However, as shown in a flowchart of another embodiment shown in FIG. 8, when there is no coincident data in step (4), a check is made in step (5) to see if all of the decision tables have been checked or not. If NO, the counter n is increased by +1 and the processes are again repeated from step (2), thereby comparing the decision tables of all of the feature extraction data tables and the content in the local buffer. When the command system cannot be decided even after completion of such a comparison, the judgment table of each feature extraction data table can be also further compared with the content in the local buffer.

<With respect to the comparing process between the decision table or judgment table and the local buffer>

One character in the data is extracted from the local buffer. When the extracted one character indicates a control code, it is compared with the data in which the command format portion of the feature extraction command table is of the control code type, thereby checking whether they coincide or not. When the extracted data indicates a character code, the feature extraction command table of the character train type is checked.

1) In case of the control code

The data is compared with the control code portion of the decision table or judgment table. When they do not coincide, another linked table is searched with reference to the link pointer portion. When the control code portion coincides, the local buffer is searched, the number of characters up to the next control code is calculated, and the table whose number of characters coincides with the character number is searched. In the consecutive type, the value of such a character number is set to the number of characters of the command. The control code is compared with each command in the command data portion by the number of characters, thereby searching the coincident table.

In the end type, a comparing process is executed to see if there is the same portion as the command data portion between the control codes by only the number of characters from the opposite direction.

2) In case of the character train type

A key word is searched and discriminated on the basis of the character train information in the local buffer. In the embodiment, the feature extraction data tables have been searched in accordance with the order at which such data tables have been registered into the link pointer table. However, when the output apparatus is actually used, in the case where the user newly adds an emulation program (control program) from the external storage medium 1512, such an emulation program is purposely selected in many cases. Therefore, when searching, a group of data in the external storage medium 1512 can be also preferentially searched.

Although the embodiment has been described with respect to the example in which only one external storage medium was set, it is also possible to set two or more external storage media by using two or more connectors. It is also possible to use a storage medium such as a hard disk or the like on which a plurality of emulation programs (control programs) have been stored.

As described above, according to the invention, in the case where a necessity of the external storage medium in which a new emulation program (control program) has been stored occurs (for instance, also including a version-up of the command level, addition of new commands, or the like), it is possible to cope with an emulation automatic switching function without changing the print control program in the output apparatus. An effect such that the complicated setting operations such as a panel operation and the like by the user can be reduced or the like can be expected. Further, as compared with the case where all of the feature extraction data tables are provided in the apparatus, according to the invention, since it is sufficient to prepare only the necessary tables as targets to be searched in the command comparison, the processing time can be reduced and the memory capacity can be saved. Further, when the output apparatus is used, in case of newly adding an emulation program (control program) by setting an external storage medium, the user purposely selects such as emulation program in many cases. A recognition ratio of the automatic recognizing process can be further improved by using the method of the invention whereby the feature extraction data table is supplied in accordance with the necessity rather than the method in which the feature extraction data tables of all of the emulation programs are provided in the apparatus.

On the other hand, the invention can be also applied to a system comprising a plurality of equipment or an apparatus comprising one equipment. It will be obviously understood that the invention can be also applied to the case where the invention is accomplished by supplying a program to embody the invention to a system or apparatus.

Figure 8:
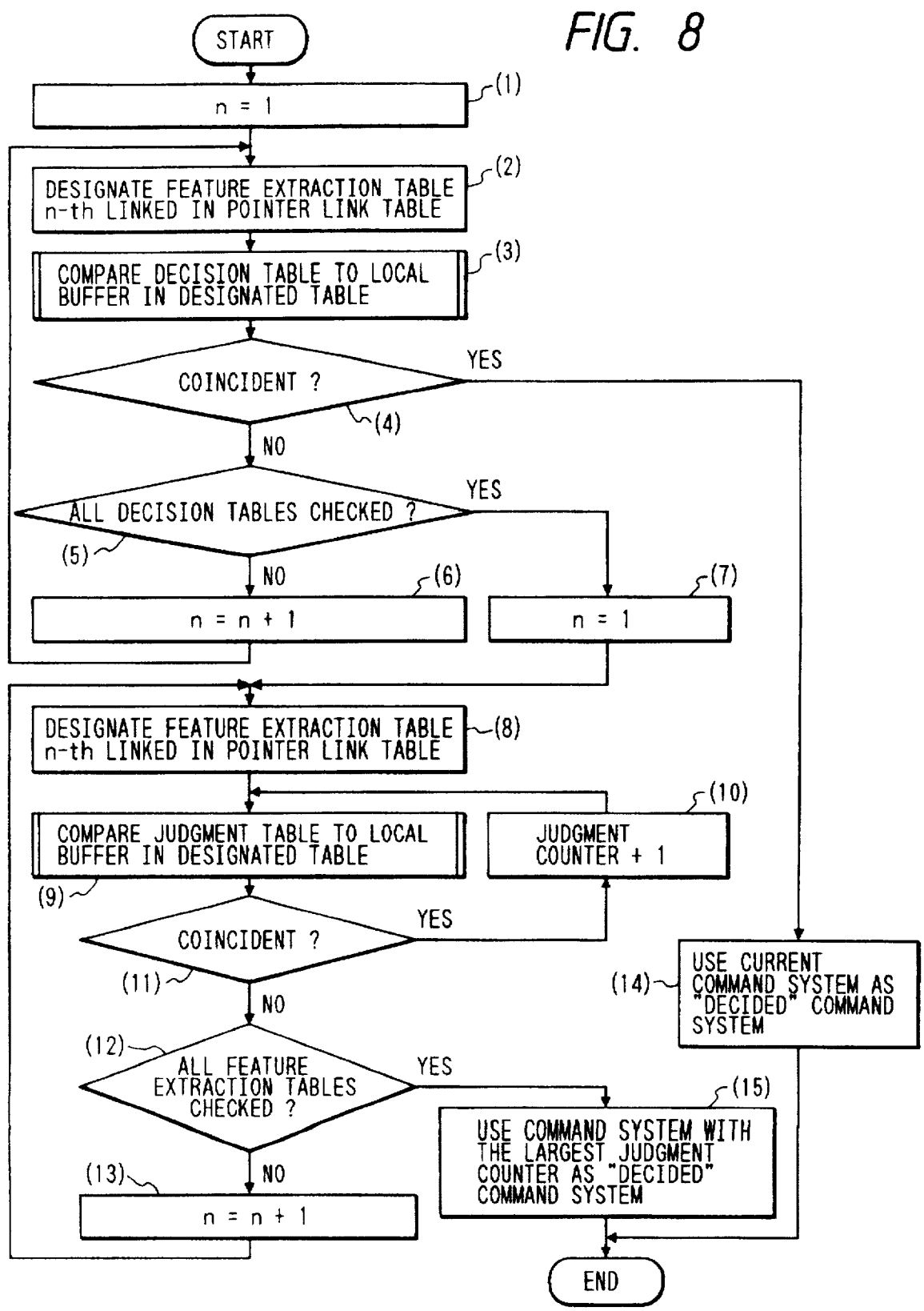
FIG. 8 is a flowchart showing an automatic recognition processing procedure of a control command system according to another embodiment.

Although the above embodiment has been described with respect to the example of the laser beam printer as an output apparatus, the invention can be also applied to a printer of another printing type as shown in FIG. 8 or a display device such as a CRT or the like.

Figure 9:
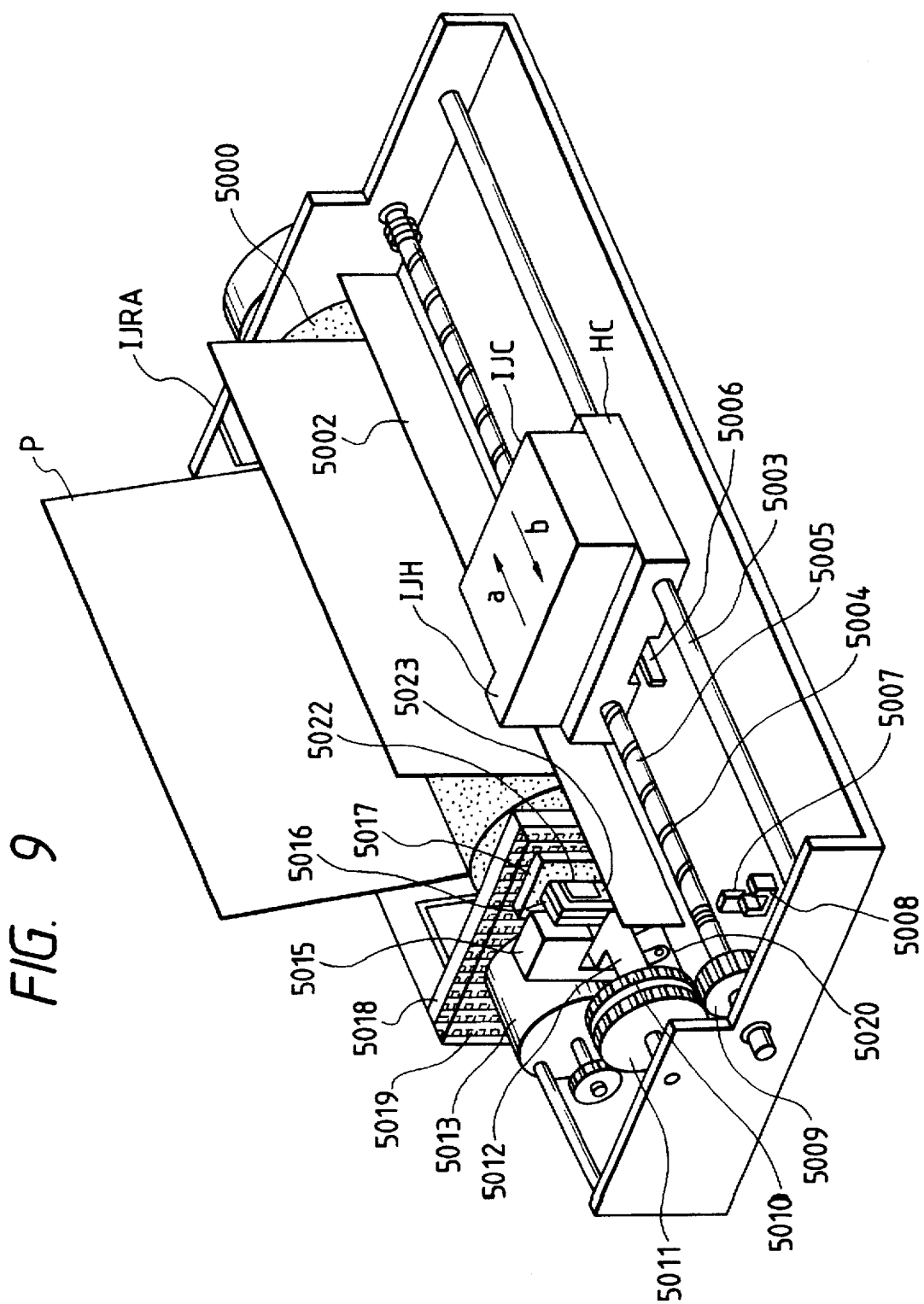
FIG. 9 is an external view showing a construction of a second output apparatus to which the invention can be applied.

FIG. 9 is an external view showing a construction of a second output apparatus to which the invention can be applied. For instance, FIG. 9 shows the case of an ink jet printing apparatus (IJRA).

In the diagram, a lead screw 5005 rotates interlockingly with the forward/reverse rotation of a driving motor 5013 through driving force transfer gears 5011 and 5009. A carriage HC is come into engagement with a spiral groove 5004 of the lead screw 5005. The carriage HC has a pin (not shown) and is reciprocated in directions indicated by arrows a and b. An ink jet cartridge (IJC) is mounted on the carriage HC. Reference numeral 5002 denotes a paper pressing plate to press a paper onto a platen 5000 in the moving direction of the carriage. Reference numerals 5007 and 5008 denote photo couplers each of which functions as home position detecting means for detecting the existence of a lever 5006 of the carriage in the region corresponding to the photo coupler, thereby executing the switching of the rotating direction of the motor 5013 or the like. Reference numeral 5016 denotes a member to indicate a cap member 5022 to cap the whole surface of a recording head; 5015 sucking means for sucking the inside of the cap and for performing the sucking recovery of the recording head through an opening 5023 in the cap; 5017 a cleaning blade which can be moved in the front/back directions by a member 5019; 5018 a main body supporting plate to support the cleaning blade 5017 and member 5019; and 5012 a lever to start the sucking of the sucking recovery. The lever 5012 is moved in association with the movement of a cam 5020 which is come into engagement with the carriage. A driving force from the driving motor is transferred and controlled by well-known transfer means such as clutch switching means or the like.

The above capping, cleaning, and sucking recovery are constructed so that a desired process can be performed at the corresponding positions of them by the operation of the lead screw 5005 when the carriage comes to the area on the home position side. However, it is sufficient to construct them so as to execute a desired operation at a well-known timing.

Figure 10:
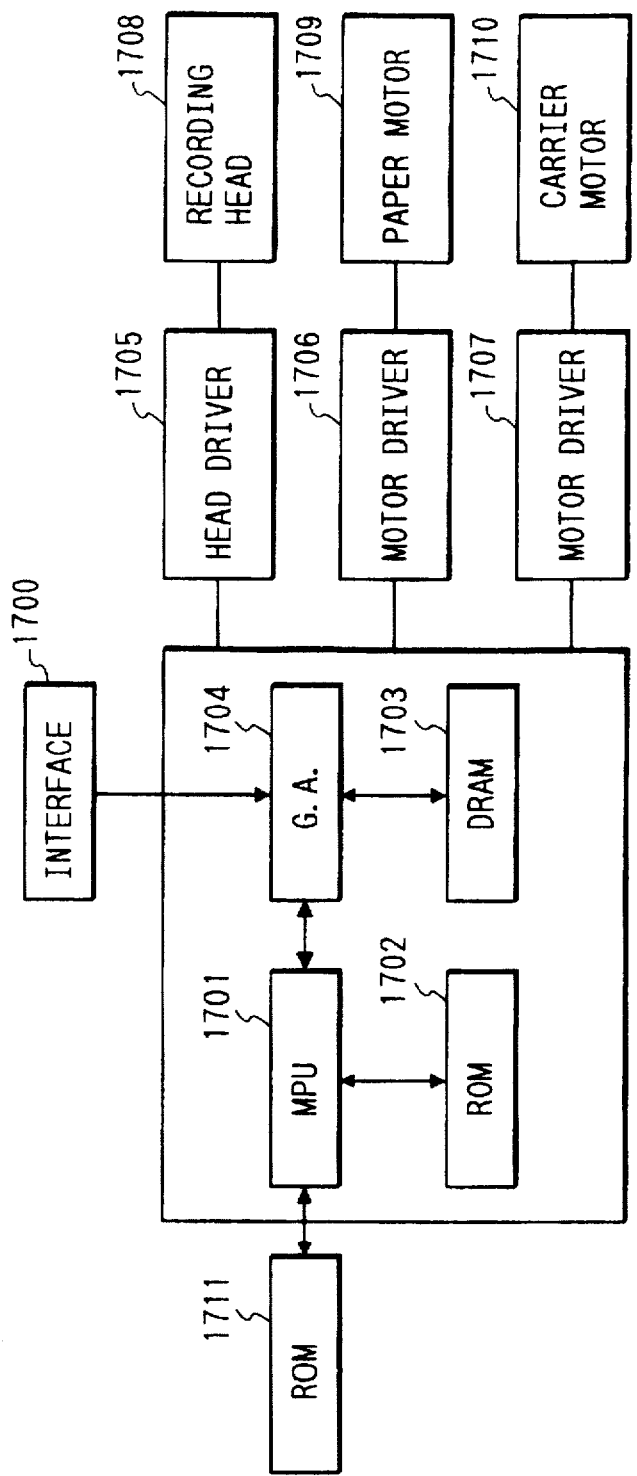
FIG. 10 is a block diagram showing a fundamental construction of the second output apparatus shown in FIG. 9.

FIG. 10 is a block diagram for explaining a control construction of a second output apparatus shown in FIG. 9.

In the diagram, reference numeral 1700 denotes an interface to receive print data comprising a character code, a control code, and the like; 1701 an MPU; and 1702 an ROM to store a control program which is executed by the MPU 1701 and the programs based on the flowcharts shown in FIGS. 7 and 8. Various kinds of data which are used to embody the invention have also been stored in the ROM 1702. Reference numeral 1703 denotes a DRAM to preserve various kinds of data (the above recording signal, recording data which is supplied to the head, and the like). Reference numeral 1704 denotes a gate array to supply and control the recording data to a recording head 1708. The gate array 1704 also transfers and controls the data among the interface 1700, MPU 1701, and DRAM 1703. Reference numeral 1710 denotes a carrier motor to convey the recording head 1708; 1709 a paper motor to convey a recording paper; 1705 a head driver to drive the recording head; 1706 a motor driver to drive the paper motor 1709; 1707 a motor driver to drive the carrier motor 1710; and 1711 an ROM constructing an external storage medium according to the invention. The other control programs which are executed by the MPU 1701 and various kinds of data and the like which are used when executing those control programs have been stored in the ROM 1711.

In each printing apparatus constructed as mentioned above, when print data is supplied from the host computer (not shown) through the interface 1700, the print data is converted into the image data for print between the gate array 1704 and the MPU 1701. The motor drivers 1706 and 1707 are driven. The recording head is driven and the printing is executed in accordance with the image data sent to the head driver 1705.

What is claimed is:

1. An output apparatus having a main body comprising:
input means for inputting a plurality of commands;
connection means for connecting external storage means which stores a first control program and a first group of data referred to for selection of the first control program to the main body;

internal storage means for storing a second control program and a second group of data referred to for selection of the second control program;

comparison means for making a comparison between one of the plurality of commands input by said input means and the first group of data stored in the external storage means or the second group of data stored in said internal storage means; and selection means for selecting one of the first control program stored in the external storage means and the second control program stored in said internal storage means in response to the comparison made by said comparison means showing that the one input command is included in the first group of data or in the second group of data.

2. An apparatus according to claim 1, wherein each of the first and second control programs comprises a program provided for interpreting the plurality of commands input by said input means, generating image data from the input commands, and outputting the generated image data.

3. An apparatus according to claim 1, wherein said selection means selects the first control program in the event that the first group of data stored in the external storage means includes data identical to the plurality of commands input by said input means.

4. An output method for apparatus having a main body and a connector which connects to the main body external storage means which stores a first control program and a first group of data referred to for selection of the first control program, said method comprising the steps of:

inputting a plurality of commands;

storing a second control program and a second group of data referred to for selection of the second control program in an internal storage means;

comparing one of the inputted plurality of commands and the first group of data stored in the external storage means or the second group of data stored in said internal storage means; and selecting one of the first control program stored in the external storage means and the second control program stored in said internal storage means in response to the comparison showing that the one input command is included in the first group of data or in the second group of data.

5. A method according to claim 4, wherein each of the first and second control programs includes a program provided for interpreting the inputted plurality of commands, generating image data from the input commands, and outputting the generated image data.

6. A method according to claim 4, wherein in said selection step the first control program is selected in the event that the first group of data stored in the external storage means include data identical to the inputted plurality of commands.

7. A storage medium for storing a program executed in an apparatus having a main body and a connector which connects to the main body external storage means which stores a first control program and a first group of data referred to for selection of the first control program, with the program comprising the steps of:

inputting a plurality of commands;

storing a second control program and a second group of data referred to for selection of the second control program in an internal storage means;

comparing one of the inputted plurality of commands and the first group of data stored in the external storage means or the second group of data stored in the internal storage means; and selecting one of the first control program stored in the external storage means and the second control program stored in said internal storage means in response to the comparison showing that the one input command is included in the first group of data or in the second group of data.

8. A storage medium according to claim 7, wherein each of the first and second control programs includes a program provided for interpreting the inputted plurality of commands, generating image data from the input commands, and outputting the generated image data.

9. A storage medium according to claim 7, wherein in said selection step the first control program is selected in the event that the first group of data stored in the external storage means includes data identical to the inputted plurality of commands.

* * * * *

UNITED STATES PATENT AND TRADEMARK OFFICE
CERTIFICATE OF CORRECTION

PATENT NO. : 5,727,133
DATED : March 10, 1998
INVENTOR(S) : SHUNYA MITSUHASHI

Page 1 of 2

It is certified that error appears in the above-identified patent and that said Letters Patent is hereby corrected as shown below:

On the title page,

AT [57] ABSTRACT

Line 6, "correspond" should read --to correspond--; and
Line 11, "correspond" should read --to correspond--.

AT [56] REFERENCES CITED

FOREIGN PATENT DOCUMENTS

"1314177" should read --1-314177--.

COLUMN 1

Line 24, "kind" (second occurrence) should be deleted;
Line 38, "which" should read --which,--;
Line 50, "correspond" should read --to correspond--;
Line 58, "correspond" should read --to correspond--; and
Line 66, "correspond" should read --to correspond--.

COLUMN 2

Line 8, "correspond" should read --to correspond--; and
Line 15, "represent" should be deleted.

COLUMN 3

Line 47, "(cPu)," should read --(CPU),--; and
Line 49, "an" should read --a--.

UNITED STATES PATENT AND TRADEMARK OFFICE
CERTIFICATE OF CORRECTION

PATENT NO. : 5,727,133
DATED : March 10, 1998
INVENTOR(S) : SHUNYA MITSUHASHI

It is certified that error appears in the above-identified patent and that said Letters Patent is hereby corrected as shown below:

<u>COLUMN 4</u>

Line 5, "data-and" should read --data and--;
    Line 57, "corresponding," should read --corresponding--; and
    Line 63, "automatic-recognizing" should read --automatic recognizing--.

<u>COLUMN 6</u>

Line 36, "them exist." should read --them.--.

<u>COLUMN 8</u>

Line 4, "data:" should read --data.--; and
    Line 26, "in" (third occurrence) should be deleted.

Signed and Sealed this

Eighth Day of September, 1998

Attest:

BRUCE LEHMAN

*Attesting Officer*     *Commissioner of Patents and Trademarks*